April 28, 1953
H. A. PELLER
2,636,777
SIDE DUMP VEHICLE WITH CAM CONTROLLED GATES
Filed Nov. 18, 1950
6 Sheets-Sheet 4
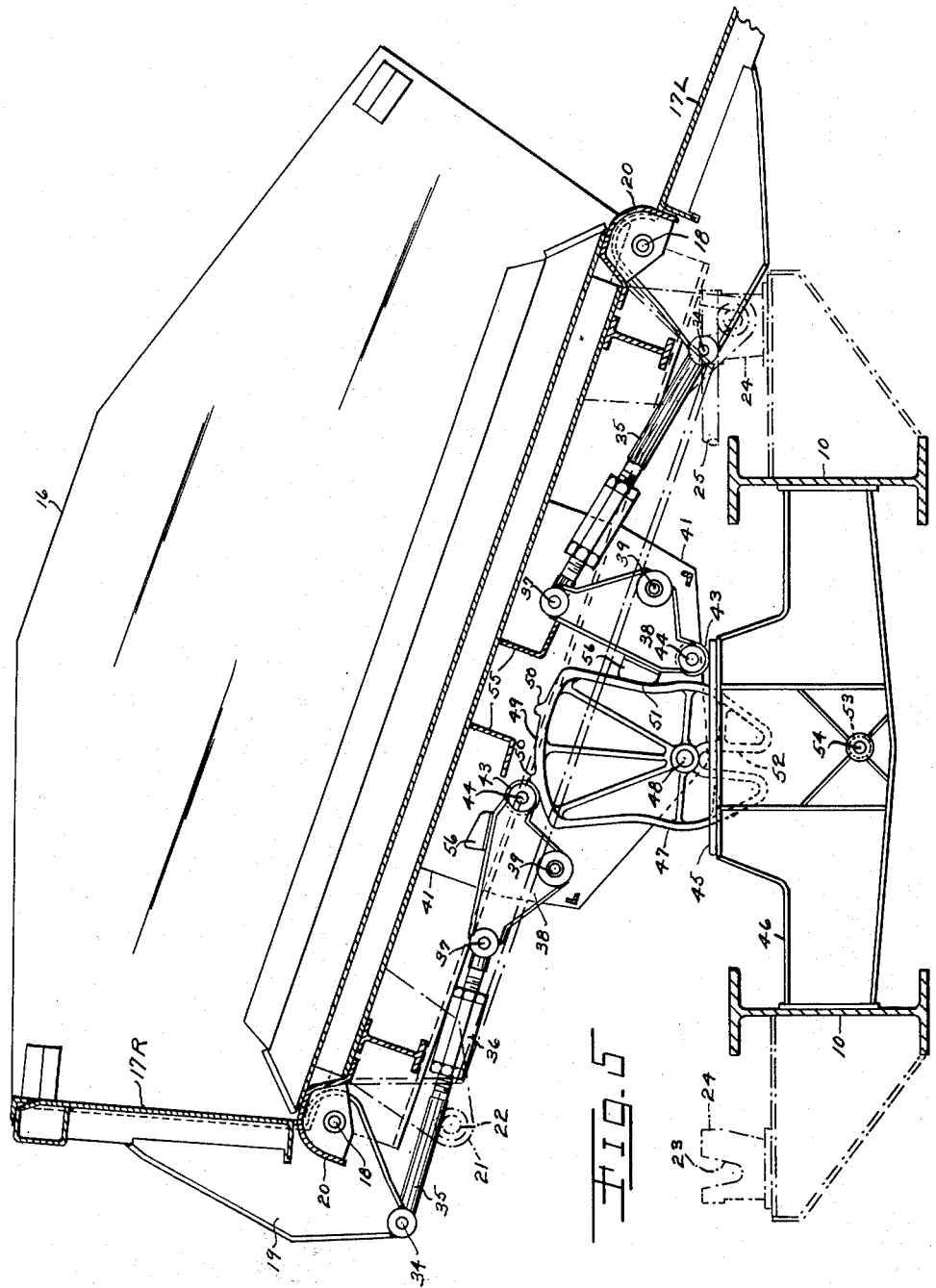
INVENTOR.
HENRY A. PELLER
BY
Hyde, Meyer, Baldwin & Doran
ATTORNEYS

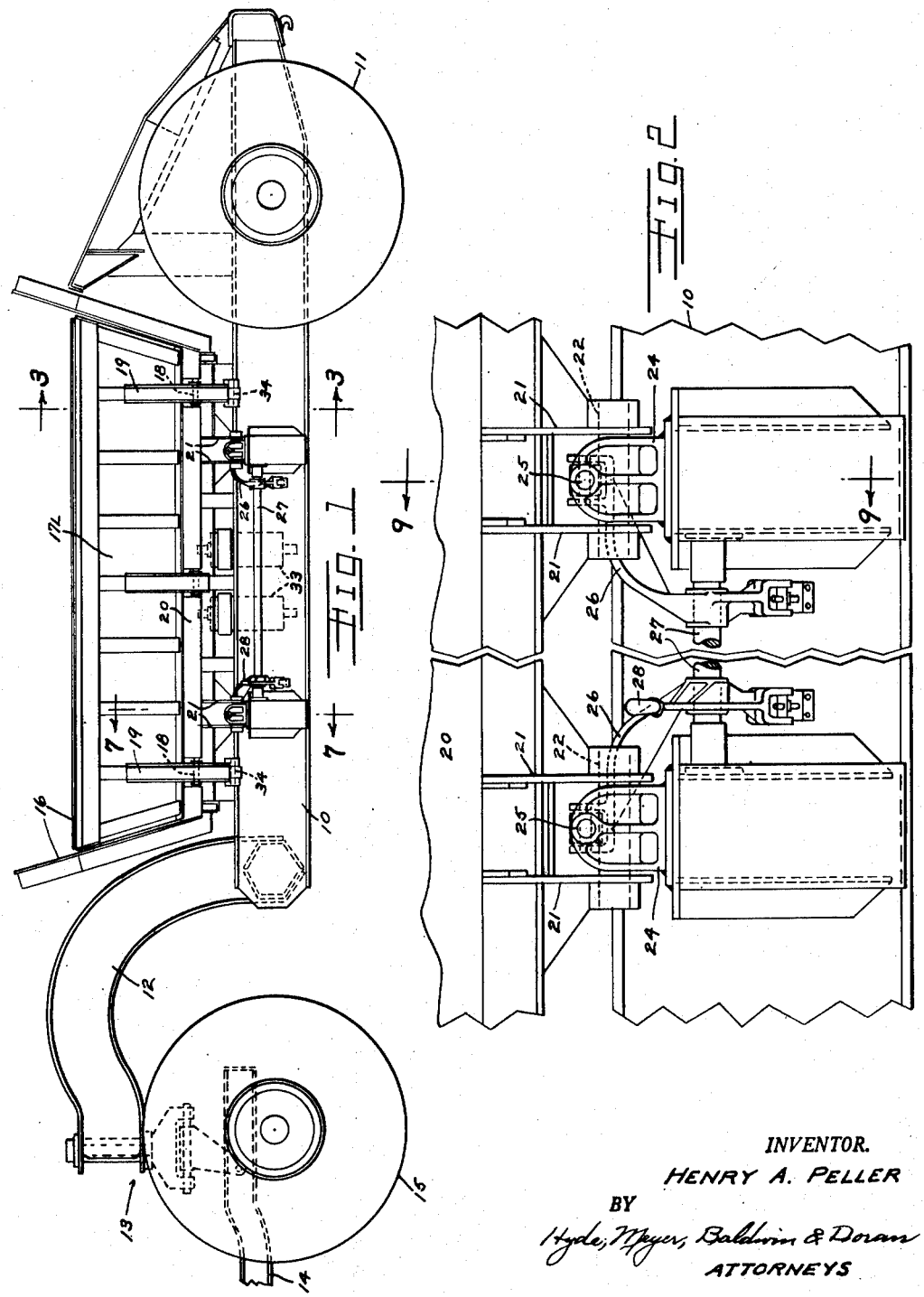

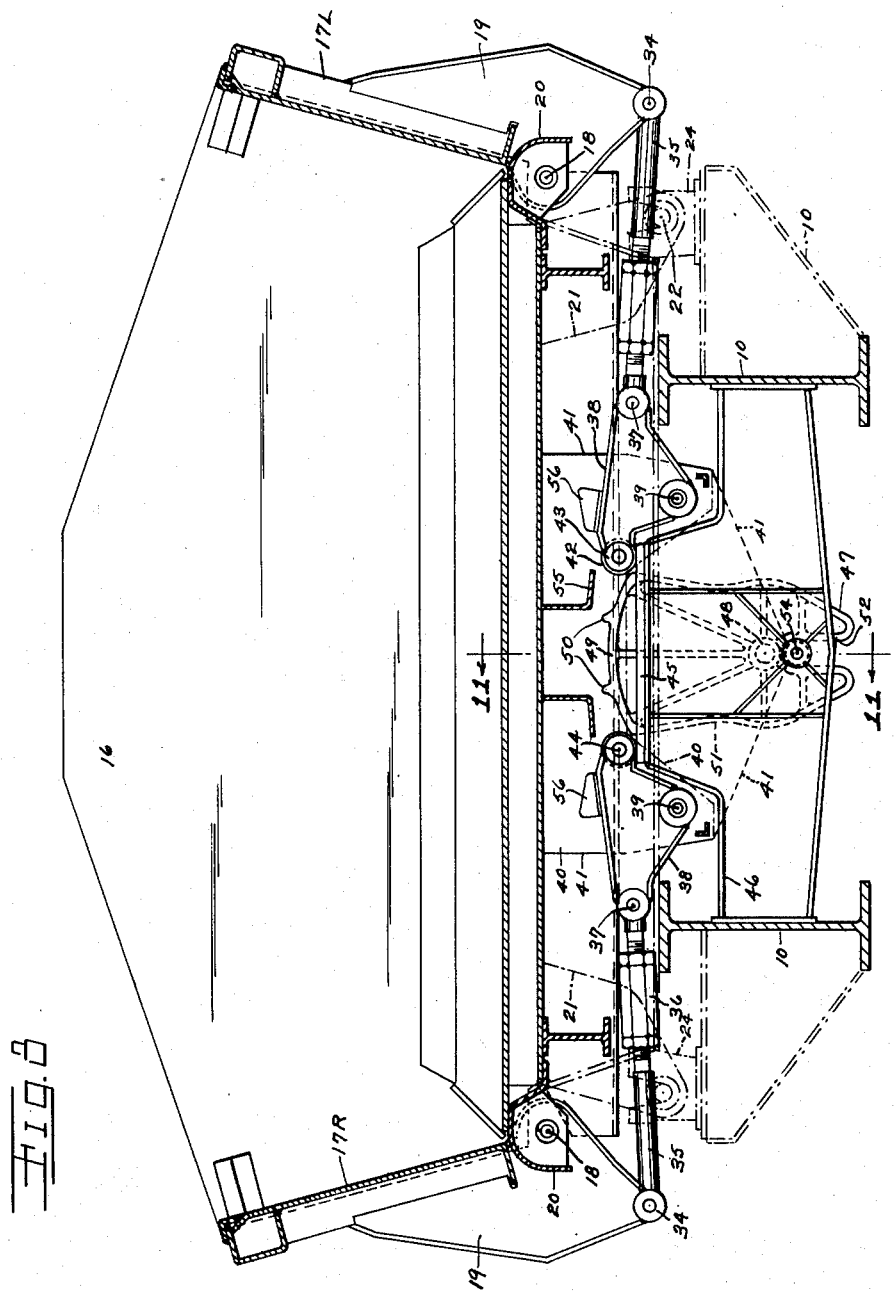

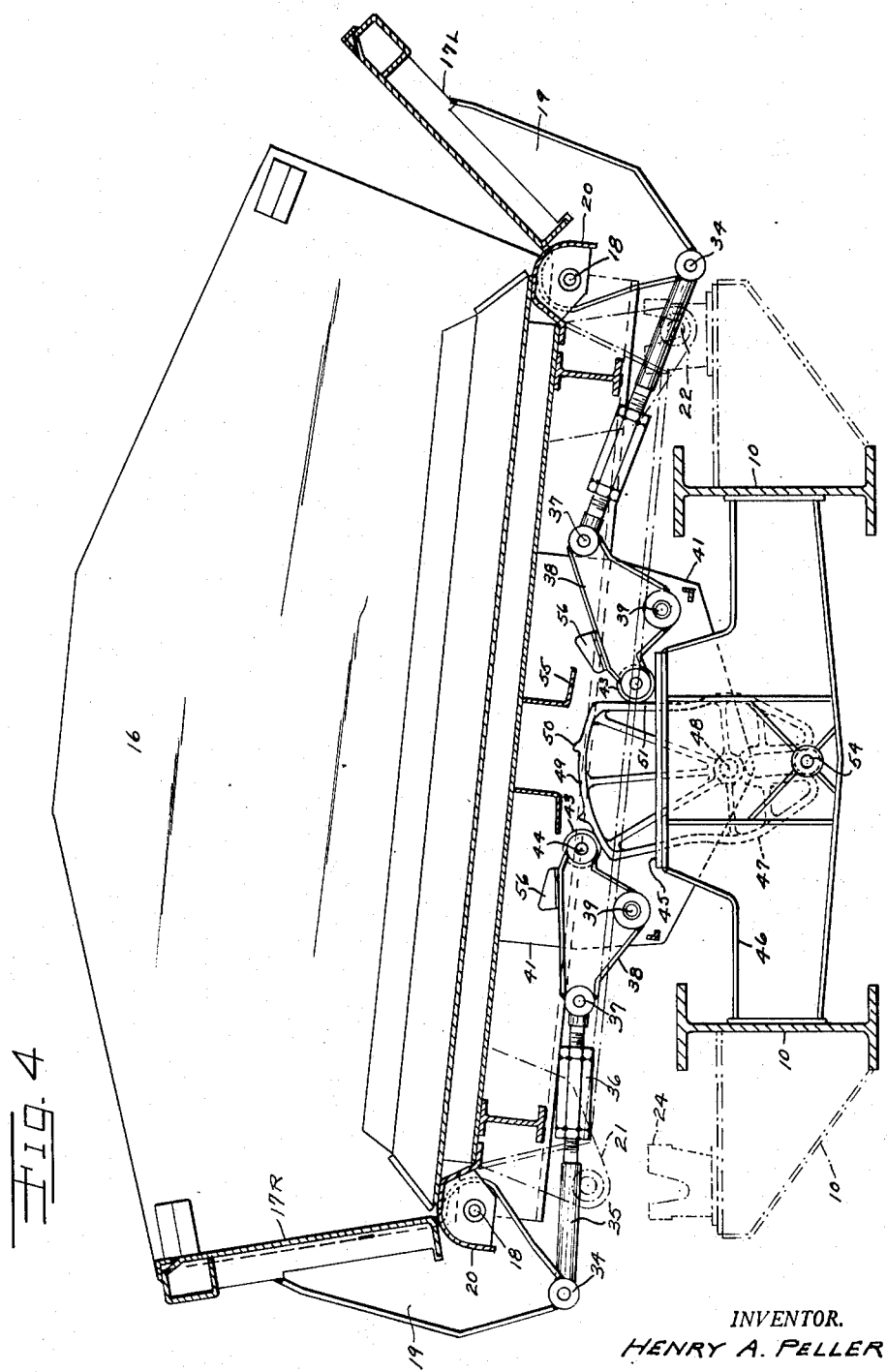

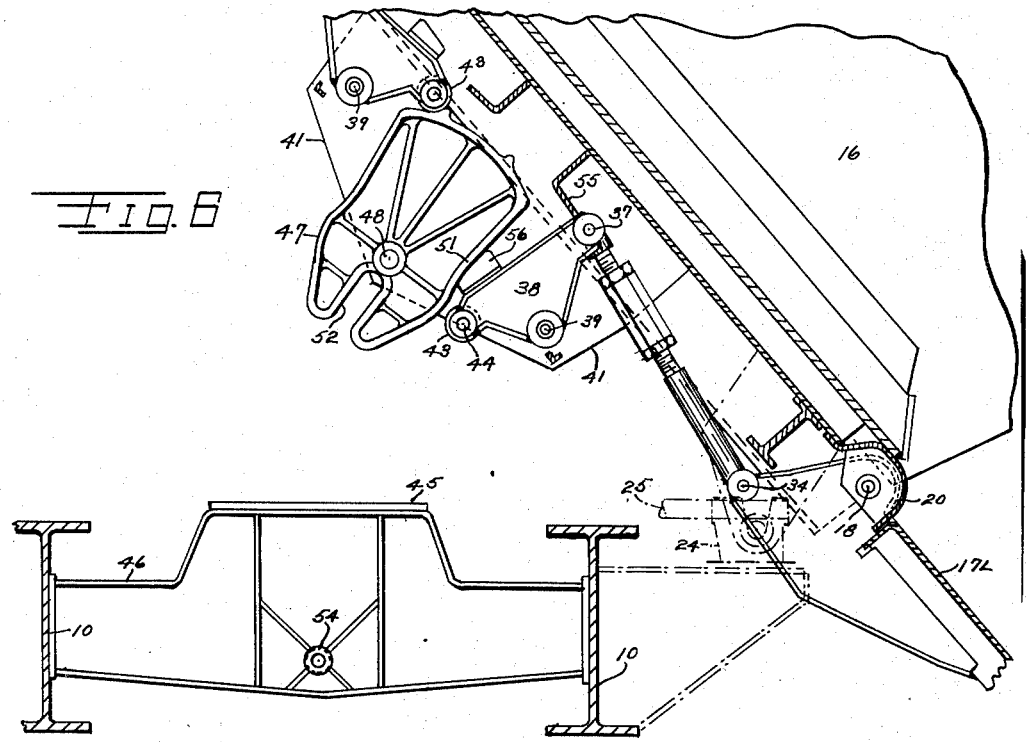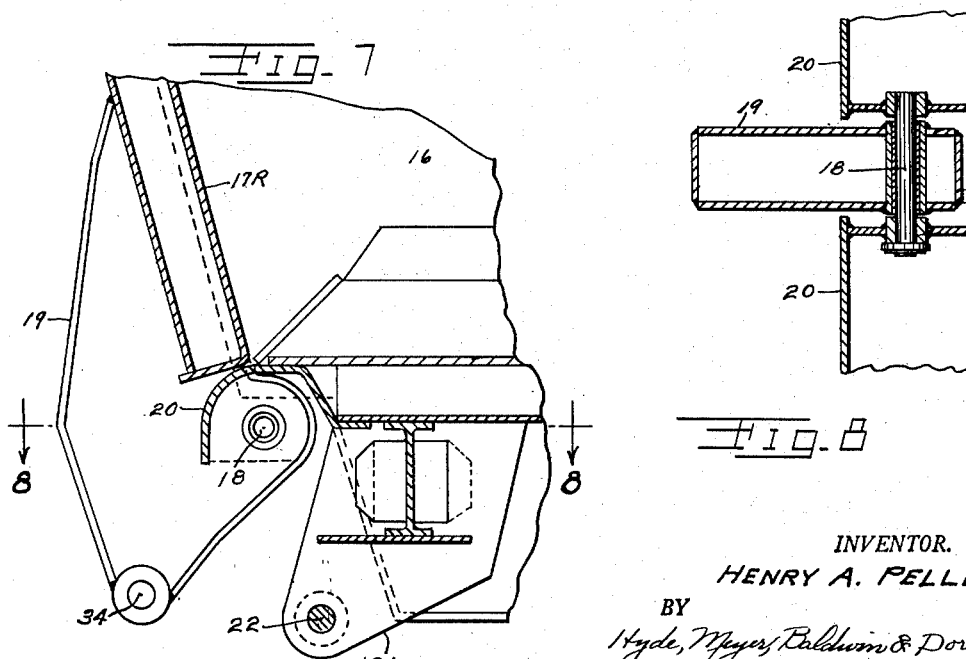

April 28, 1953 H. A. PELLER 2,636,777
SIDE DUMP VEHICLE WITH CAM CONTROLLED GATES
Filed Nov. 18, 1950 6 Sheets-Sheet 6
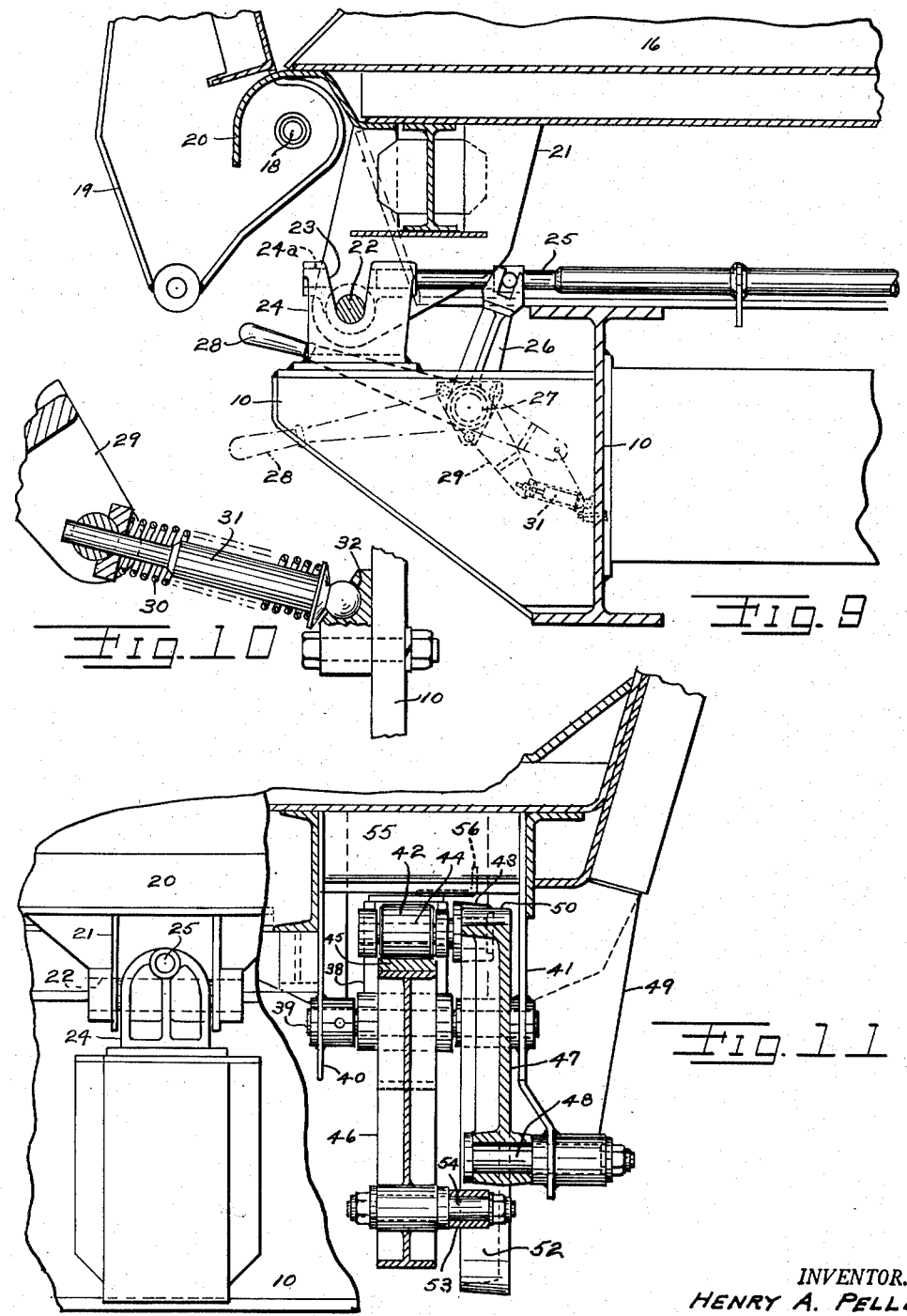
INVENTOR.
HENRY A. PELLER
BY
Hyde, Meyer, Baldwin & Doran
ATTORNEYS

Patented Apr. 28, 1953

2,636,777

UNITED STATES PATENT OFFICE 2,636,777

SIDE DUMP VEHICLE WITH CAM
CONTROLLED GATES

Henry A. Peller, Euclid, Ohio, assignor to The
Euclid Road Machinery Co., Euclid, Ohio, a
corporation of Ohio Application November 18, 1950, Serial No. 196,440

6 Claims. (Cl. 298—18)

This invention relates to side dump load carrying vehicles, and more particularly to the means and mechanism for controlling the doors to open only that door or doors on the side of the body where the dumping is to take place.

One of the objects of the present invention is to provide means for permitting the gate or door on the lower side of the body to open during dumping while locking the gate or door on the upper side of the body, and wherein the entire mechanism is mounted to and part of the body, thus eliminating any mechanical linkage or ties to the frame and thereby avoiding misalignment problems which cause undue strains and resultant breakage of mechanisms of like character while the vehicle is dumping over extremely rough terrain.

Another object of the present invention is the provision of two identical leverage systems for controlling the opening of the desired gate with a single door locking cam mounted symmetrically between the doors on opposite sides of the body for holding that door locked on the upper side of the body, so that the mechanism operates automatically for dumping to either side of the body without any attention on the part of the operator.

With the above and other objects in view, which will appear as the description proceeds, this invention resides in the novel construction, combination and arrangement of the parts substantially as hereinafter described and more particularly defined by the appended claims, it being understood that such changes in the precise embodiment of the herein disclosed invention may be made as come within the scope of the claims.

In the drawings,

Fig. 1 is a side elevational view of a side dump trailer vehicle body embodying my invention;

Fig. 2 is an enlarged fragmental side elevational view of portions of Fig. 1 with parts thereof broken away;

Fig. 3 is an enlarged transverse sectional view taken along the line 3—3 of Fig. 1;

Figs. 4 and 5 are transverse sectional views similar to Fig. 3 and showing the mechanism in other positions;

Fig. 6 is a fragmental view taken similarly to Figs. 3, 4 and 5 and showing still another position of the gate operating parts;

Fig. 7 is an enlarged fragmental sectional view taken along the line 7—7 of Fig. 1;

Fig. 8 is a fragmental sectional view taken along the line 8—8 of Fig. 7;

Fig. 9 is a fragmental sectional view taken along the line 9—9 of Fig. 2;

Fig. 10 is an enlarged view of a portion of the lower part of Fig. 9 there shown in broken lines; while Fig. 11 is a sectional view enlarged taken generally along the line 11—11 of Fig. 3.

I have chosen to show my invention as applied to a vehicle of the trailer type as shown in Fig. 1 although it will be understood that my invention may be applied to other forms of load carrying vehicles. The trailer is here shown somewhat conventionally as comprising a main supporting frame 10, the rear end of which is supported upon wheels 11 and the front end of which is supported by means of the drawbar 12 and hitch 13 upon a tractor 14 having wheels 15. On the frame is mounted a load carrying hopper body 16 of suitable size, shape and proportions, open at its top and provided on its laterally opposite sides with one or more swinging doors or gates 17L and 17R mounted to oscillate on horizontally extending hinge pins 18 extending along the lower edges of the doors and connected with the doors by ribs 19 rigidly connected with the doors. The opening between each door and the body is protected by a depending shield or guard 20 attached to the body.

The hopper body 16 is arranged to hinge at either the right or left side on the main frame 10 in order to tilt to one side or the other as desired. For this purpose the frame of the body is provided at each side with two or more sets of depending brackets 21, each set supporting a hinge pin 22 designed to rest in the upwardly opening recess 23 of a cradle member 24 rigidly secured to the main supporting frame 10. The cradles on opposite sides of the frame are aligned in pairs, one pair toward the front of the body and one pair toward the rear thereof. Each pair of aligned cradles on opposite sides of the body cooperates with a heavy transversely extending slidable locking bar 25, best seen in Fig. 9, manually slidable from side to side by means of a yoke 26 oscillatable upon a longitudinally extending shaft 27 mounted on the main frame. This yoke is manipulated by means of its handle 28. Shaft 27, as clearly seen in Figs. 1 and 2, is rigidly connected with both the fore-and-aft yokes 26 so that the handle 28 operates both bars 25. An arm 29 (Figs. 9 and 10) rigid with shaft 27 supports a snap action biasing spring embracing a pin 31 in a manner so that the spring is held in compression and the pin has a ball and socket joint at 32 resting on the main frame 10. It results from this construction that the bars 25 will be held in either of their extreme positions, one of which is shown in full lines in Fig. 9 and the other of which causes the nose of each bar 25 to be received in the aperture 24a of its associated saddle 24 whereby the locking bar is securely held above the hinge pin 22. The bars 25 are of such length that in one of these positions the hinge pins 22 on one side of the body are locked in their seats and those on the other side of the body are released.

Two expansible chamber motors 33 are connected between the main frame 10 and the center of the body 16 in a known manner so that the body may be elevated at the will of the operator by supplying pressure fluid to the servomotors 33 from a source and by means of controls not shown but which are well known in this art. It results from this construction that when the servomotors 33 are operated, the body is elevated and tilted toward one side or the other, according to that set of hinge pins 22 which are locked, and which set are released. The direction of the tilt is selected manually by appropriately positioning the handle 28 before operating the body elevating servomotors.

The mechanism for controlling the gates 17L and 17R consists of identical parts on opposite sides of the body and one set only will be described. Each side door of the vehicle, when the body is in its normal horizontal position, as in Fig. 3, occupies a position with its center of gravity above, but outwardly beyond, its hinge or pivot pins 18, so that by gravity alone it tends to swing open. It is restrained from so moving by two sets of mechanisms which are identical, one near the rear of the body and one near the front end of the body. Each rib 19 integral with one of the doors 17L or 17R supports an eye 34 to which is pivotally connected a link 35 which is adjustable as to length by means of a turnbuckle 36. The inner end of each link 35 is pivotally connected at 37 to a bell crank 38 which is oscillatable about a pivot pin 39 which is mounted in two parallel plate brackets 40 and 41 best seen in Figs. 3 and 11. These plates are rigidly connected to the main frame of the vehicle body 16. Each bell crank also supports a pair of coaxial rollers 42 and 43 mounted on the same shaft 44. During the opening movement of the gate 17L from the fully closed position of Fig. 3 to the fully open position of Fig. 5, the roller 42 controlling this gate rides along a wear plate 45 which is permanently secured to a cross beam 46, here shown of I-beam form, which is part of the main frame 10. This is one of the advantages of my invention because the full weight of the operating load resting on the door 17L on the lower side of the body is taken by the strong frame structure 45, 46, part of the main frame 10. The roller 43 carries the much lighter load of positioning the cam 47 to keep the gate on the high side of the body in the locked or inoperative position as will presently appear.

A single cam 47, mounted on the vehicle body 16 is provided for controlling the locking of the gate on the upper or higher side of the body, whichever side is tilted upwardly. This cam is oscillatably mounted upon a pin 48 which is carried by the lowermost portion of the plate bracket 41, previously described. This structure is strengthened by means of the vertical rib 49 clearly shown in Fig. 11. The cam 47 is symmetrical about its center line and has a convex top portion 49 arcuate about the pivot 48 and having two locking projections 50 spaced inwardly from the ends of the arcuate portion. The sides of the cam are slightly concave as shown at 51. The bottom of the cam has a radial slot 52 extending from the bottom of the cam inwardly almost to the pivot pin 48. A roller 53 is rotatably mounted upon a pin 54 which is fixed in the beam 46 as clearly shown in Figs. 5, 6 and 11. The roller 53 is adapted to enter the slot 52 as shown in Figs. 3 and 4. A stop 55 is provided on the vehicle body and another stop 56 is provided rigidly fastened to the bell crank 38 for purposes which will presently appear.

The operation of my improved gate control mechanism should now be obvious. With the body hinge pin 22 locked in its seat 24 on the right-hand side of the mechanism as shown in Figs. 3, 4, 5 and 6, by means of the locking bars 25 previously described, the operator supplies pressure fluid to the servomotors 33 and the vehicle body begins to tilt. The body 16 carries the bracket 41 upwardly with it, pivoting about the right-hand pin 22. This lifts the cam 47 whose pivotal pin mounting 48 moves in an arc about the pin 22. Roller 53 in slot 52 of the cam causes the cam to move slightly counterclockwise from the position of Fig. 3 to the position of Fig. 4. During the first six degrees of body tilt, the arcuate surface 49 of the top portion of the cam moves under the roller 43 of the bell crank 38 which controls the gate 17R on the upper side of the body. This prevents any rotary motion of bell crank 38 on that side and in this manner keeps the gate on the higher side of the body locked when its control roller 42 leaves the wear plate 45.

After the first six degrees of body tilt, when the roller 53 begins to leave the cam slot 52 as shown in Fig. 4, the stop projection 50 is moved against the roller 43 thus locking the gate closed on the high side of the body. At about the same time the control roller 43 of mechanism controlling gate 17L has rounded the upper right-hand corner of cam 47 and has started to travel down the concave cam portion 51 in the position of Fig. 4. While the body continues to rise from the six degree tilt of Fig. 4 and almost until it reaches the twenty degree tilt of Fig. 5, the opening gate 17L continues to rotate to its fully open position and its bell crank 38 also continues to rotate until it engages the stop 55 as shown in Fig. 5. During this movement, cam 47 does not move relative to the vehicle body. During this movement, from just before the position of Fig. 4 to just before the position of Fig. 5, the control roller 43 travels along the concave cam portion 51, but the load due to the material in the vehicle body against the gate 17L is carried by the contact between roller 42 and the wear plate 45 on the beam 46, thus controlling the rate of opening of the gate 17L.

At the twenty degree body tilt position as shown in Fig. 5, the side gate 17L is fully open and cam 47 is locked in place by means of the stop 56 on the bell crank 38 on the right-hand side thereof as shown in Fig. 5 and between projection 50 against the roller 43 of the bell crank 38 on the left-hand side of the cam. This prevents any rotary motion of the cam 47 while the body moves from the twenty degree tilt position of Fig. 5 to the fifty degree tilt or full dump position of Fig. 6. Then upon reversing the operation of the servomotors 33, gravity is permitted to bring the body back to the position of Fig. 3, ready for another operation. Tilting toward the opposite side is exactly the same but with the movements of the gate control parts on the right and left hand sides of the body simply reversed.

What I claim is:

1. In a side dump vehicle having a frame and a hopper body pivotally mounted thereon upon a longitudinal axis near one side of the body, and provided with a side gate hinged along its lower edge to the body, and provided with means for elevating the body to tilt it about its pivotal axis with said gate on the lower side of said body, the combination therewith of gate controlling mechanism including a bell crank pivotally mounted on said body, a link connected between said gate and said bell crank, a cam pivotally mounted on said body, and a roller rotatably mounted on said bell crank on the side of its pivotal mounting opposite said link connection, said roller in position to engage said cam, whereby as said body rises, said bell crank is controlled by said cam as it oscillates in gate opening direction.

2. In a side dump vehicle having a frame and a hopper body pivotally mounted thereon upon a longitudinal axis near one side of the body, and provided with side gates on opposite sides of said body, each gate hinged along its lower edge to said body, and provided with means for elevating the body to tilt it about its pivotal axis, the combination therewith of a cam pivotally mounted on said body, separate mechanisms connected with each of said gates for controlling the position thereof, and means on said frame engageable with said cam upon initiation of an elevating operation of said body for moving said cam into locking relationship with said mechanism connected with that gate on the upper side of said body for holding the latter closed.

3. The combinatin of claim 2 including pivotal mountings of said body on said frame upon selective longitudinal axes near each side of the body, and said cam is movable by said means on said frame into locking relationship with the gate on the upper side of said body by slight relative movement between said body and frame to tilt said body about either of said axes.

4. In a side dump vehicle having a frame and a hopper body pivotally mounted thereon upon selected longitudinal axes near each side of the body, and provided with side gates on opposite sides of said body, each gate hinged along its lower edge to said body, and provided with means for elevating the body to tilt it about its pivotal axis, the combination therewith of a controlling mechanism for each gate including a bell crank pivotally mounted on said body and a link connected between said gate and said bell crank, a roller rotatably mounted on each bell crank on the side of its pivotal mounting opposite said link connection, a cam pivotally mounted on said body, and means on said frame engageable with said cam by slight relative movement between said body and frame upon initiation of an elevating operation of said body for moving said cam into locking relationship with said bell crank mounted roller of said gate controlling mechanism connected with that gate on the upper side of said body for holding the latter closed, while said bell crank of said gate controlling mechanism connected with that gate on the lower side of said body oscillates in gate opening direction.

5. The combination of claim 4 including a plate on said frame engageable with the bell crank roller of the gate controlling mechanism connected with that gate on the lower side of said body for controlling the rate at which the gate on the lower side of said body opens as said body is elevated.

6. The combination of claim 5 wherein the pivotal mounting of said cam on said body is on the longitudinally extending center line of said body, said cam is provided with an upper convex portion arcuate about the pivotal mounting of said cam and adapted to move beneath the roller of said bell crank connected with the gate controlling mechanism for the gate on the upper side of said body, there being a slot in said cam extending radially below the pivotal mounting of said cam in a vertical direction downwardly when said body is in unoperated position, and a pin on said frame engaged in said slot when said body is in unoperated position, whereby upon slight relative movement between said body and said frame, said pin acts upon said cam to move said arcuate upper portion thereof into engagement with the roller of said bell crank of the gate controlling mechanism connected with the gate on the upper side of said body for holding the latter closed.

HENRY A. PELLER.

References Cited in the file of this patent

UNITED STATES PATENTS

| Number | Name | Date |
|---|---|---|
| 2,428,629 | Kordish et al. | Oct. 7, 1947 |